E. G. KILLERBRUE.
ATTACHMENT FOR WHEELS.
APPLICATION FILED JAN. 5, 1921.
1,438,117.
Patented Dec. 5, 1922.
2 SHEETS—SHEET 1.
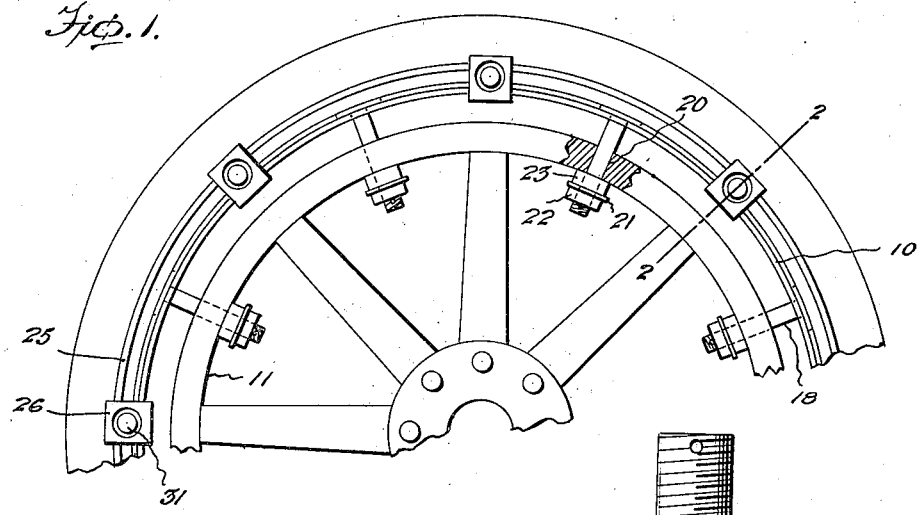
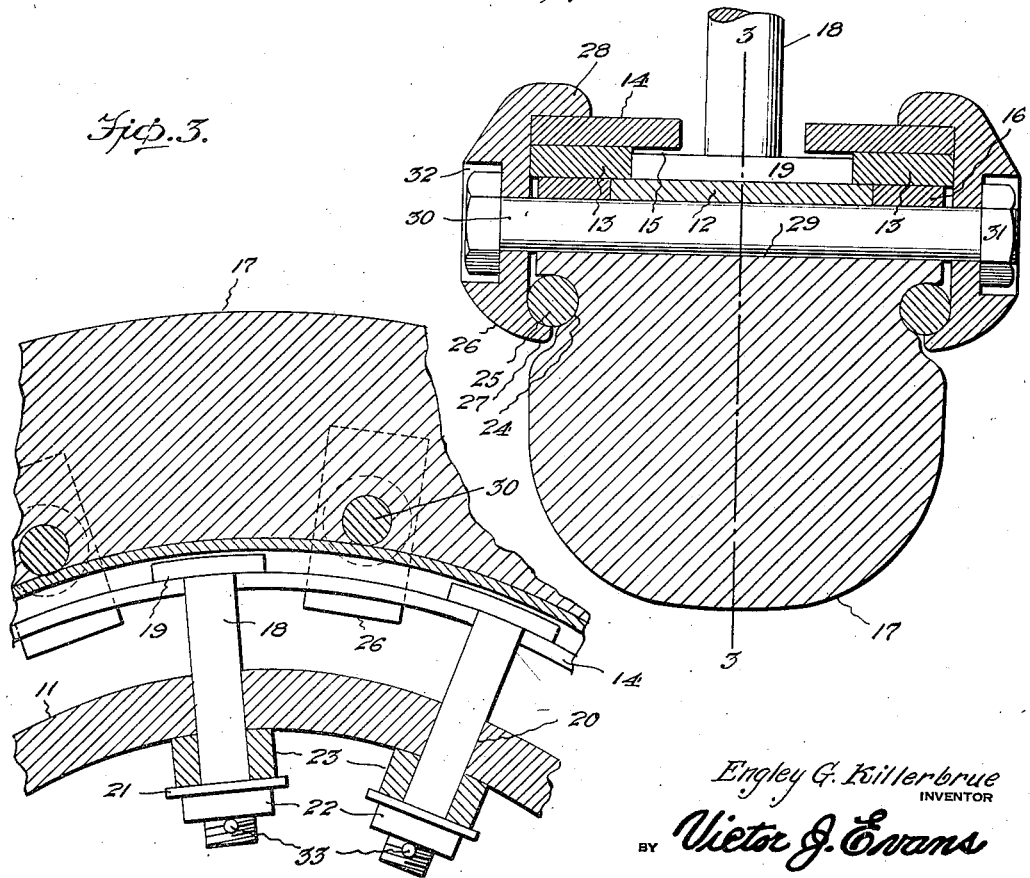
Engley G. Killerbrue
INVENTOR
BY Victor J. Evans
ATTORNEY

E. G. KILLERBRUE.
ATTACHMENT FOR WHEELS.
APPLICATION FILED JAN. 5, 1921.

1,438,117.

Patented Dec. 5, 1922.
2 SHEETS—SHEET 2.

Engley G. Killerbrue
INVENTOR

BY Victor J. Evans
ATTORNEY

Patented Dec. 5, 1922.

1,438,117

UNITED STATES PATENT OFFICE.

ENGLEY G. KILLERBRUE, OF CHICAGO, ILLINOIS.

ATTACHMENT FOR WHEELS.

Application filed January 5, 1921. Serial No. 435,163.

*To all whom it may concern:*

Be it known that I, ENGLEY G. KILLERBRUE, a citizen of the United States, residing at Chicago, in the county of Cook and State of Illinois, have invented new and useful Improvements in Attachments for Wheels, of which the following is a specification.

This invention relates to improvements in vehicle wheels and has for an object the provision of means whereby an ordinary rigid wheel may be converted into a spring wheel.

To this end the invention contemplates the provision of a rim structure which may be attached to the ordinary or other vehicle wheel in a manner to take up shocks and jars incident to travel over rough or uneven roads and to thus eliminate the necessity for the use of pneumatic tires, together with their expense and many inconveniences.

Another object of the invention is the provision of a rim structure embodying means for connection to a vehicle rim or felly in such manner as to permit of circumferential movement relative to the wheel and permit the wheel to support the weight of the vehicle above the wheel axle and leave that portion of the rim below the axle free, the manner of attachment of the rim to the wheel permitting free relative movement thereon, so that the lower half of the rim provides a cushion for the wheel.

Another object of the invention is the provision of a resilient rim structure which embodies a plurality of annular flat springs, certain of which overlap the edges of other springs to provide a substantially T-shaped annular groove for the reception of bolts which serve to attach the rim structure to a wheel, the attaching means being such that certain of them will, when the wheel is subjected to weight, clutch the rim to establish active driving connection between the wheel and rim, yet permit of the cushioning effect above mentioned.

A further object of the invention is to provide means for detachably connecting the resilient rim structure and a tire, the said means permitting of the ready removal of the tire when necessary or desired.

A still further object of the invention is to provide means for absorbing radial strain between the wheel and the rim structure.

Other objects and advantages of the invention will appear as the following description is read in connection with the accompanying drawings.

In the drawings:—

Figure 1 shows a fragmentary side elevation of a portion of a vehicle wheel with the invention applied thereto.

Figure 2 is an enlarged sectional view on the line 2—2 of Figure 1.

Figure 3 is a section on the line 3—3 of Figure 2.

Figure 5:
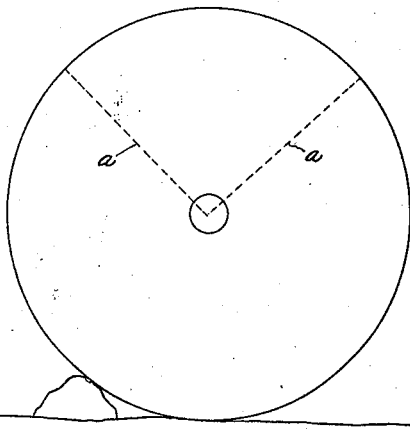
Figure 5 is a diagram illustrating the manner in which the wheel supports weight.

Referring in detail to the drawings, wherein like characters of reference denote corresponding parts, the invention as illustrated includes a rim which is indicated at 10 and which is adapted to be secured to a vehicle wheel of rigid structure, such as is illustrated at 11. This wheel may be of the usual or any preferred type, the invention being applicable to vehicle wheels of various makes.

The improved rim is formed of a plurality of annular members of a resilient character and includes an annular member 12 and spaced annular members 13, the latter projecting outwardly over the edges of the member 12. Additional annular members 14 have their inner opposed edges extending over the adjacent edges of the members 13, so that these members 13 and 14 together with the member 12 provide an annular substantially T-shaped groove 15.

The member 12 is relatively wide as shown and fits between annular beads 16 formed around the inner periphery of a tire 17, the latter being shown as of the solid rubber type, but it is of course understood that a tire of different structure may be used if desired.

In order to secure the rim to the wheel 11, there is provided a plurality of bolts 18. These bolts have their heads 19 disposed within the T-shaped groove 15 and are capable of circumferential movement therein, the width of the heads 19 being slightly less than the depth of the groove so that a limited radial movement is permitted. The shanks of the bolts 18 extend through openings 20 provided in the felly of the wheel 11 and the inner ends of these bolts are provided with washers 21 and nuts 22. Interposed between the washers 21 and the inner periphery of the felly of the wheel is a cushioning member 23, of rubber or other suitable material, the purpose being to absorb radial shocks between the rim and wheel due to the radial movement of the bolts 18 within the openings 20.

The tire 17 is provided with annular substantially semi-circular grooves 24, upon opposite sides thereof. These grooves are adapted to receive spring rings 25, while clamps 26 which are located at spaced intervals about the circumference of the rim have one of their ends provided with hooks 27 which engage over the rings 25, while their opposite ends are formed with hooks 28 which engage over the edges of the inner periphery of the rim structure. The clamps 26 are formed with openings, which align with openings 29 provided in the tire 17, bolts 30 passing through these openings for the purpose of holding the clamps in position. The spring rings 25 may thus be securely held in place and the tire secured to the rim. The heads of the bolts 30 and the nuts 31 which are mounted thereon are preferably seated within depressions or sockets 32 provided in the clamps 26 so as to protect them from damage in the event of the vehicle wheel being scraped against a curbing or similar obstruction.

Figure 4:
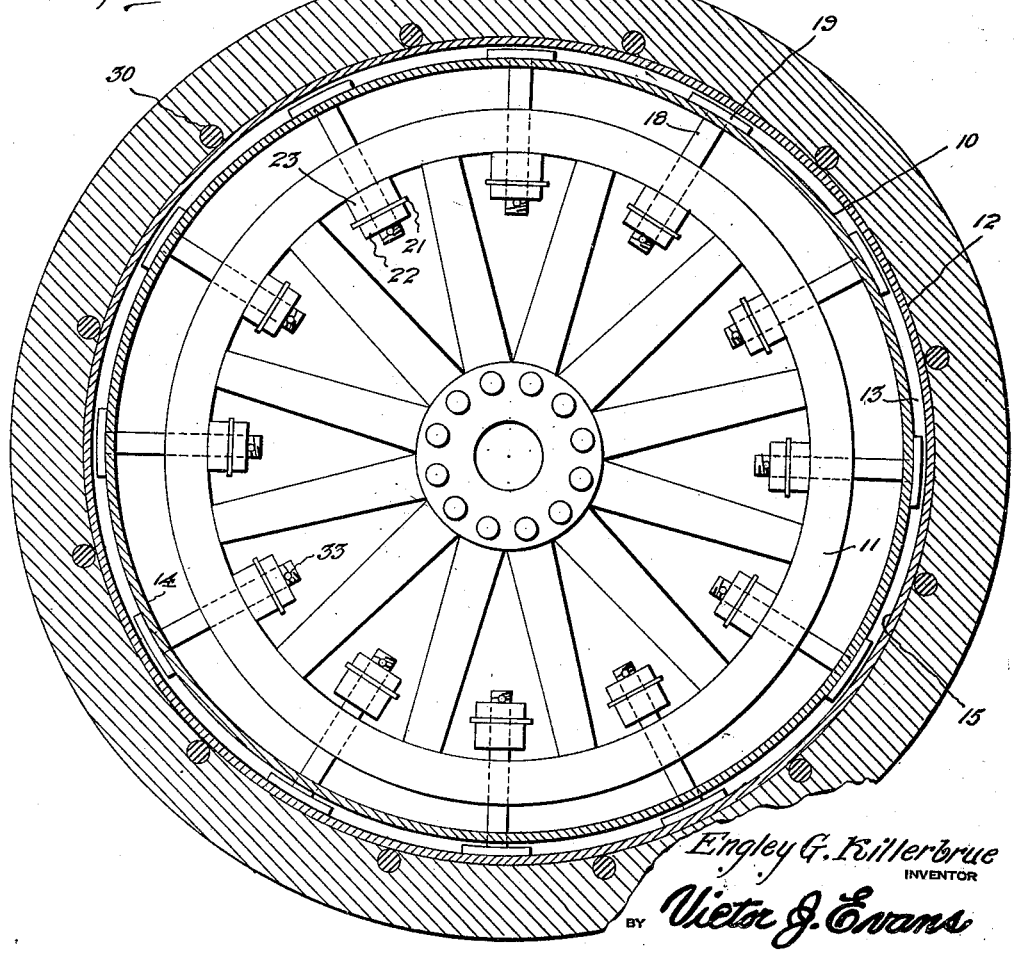
Figure 4 is a side elevation of a vehicle wheel with the invention shown in section, the parts being shown in the position they assume when the wheel is subjected to weight.

It will be apparent from the foregoing description and the accompanying drawings that when the invention is in use, that the weight which the wheel supports will be suspended from points approximately between the dotted lines a—a shown in Figure 5. As the heads of the bolts 18 are permitted free circumferential movement in the groove 15, the remainder of the rim will be permitted to move relatively to the wheel, the amount of this movement being increased toward the lower or tread portion of the wheel as illustrated in Figure 4 of the drawings. This will act to spread the rim and consequently the tire which it carries, so that its horizontal diameter will be greater than its vertical diameter. This will act to cause the heads 19 of the bolts 18 to frictionally grip the inner walls of the groove 15 so as to effect a clutching action and lock the tire against circumferential movement with respect to the wheel, the firmest grip being located at a point through the horizontal center line of the wheel. This clutching action between the wheel and rim will be continually changing during the travel of the vehicle or the rotation of the wheel so that the bolts will be alternately clutched and released. This will materially increase the life of the rim structure and tire, while wear upon the bolts or the springs which compose the rim structure may be taken up by tightening the bolts. If desired, cotter pins 33 may be inserted through the ends of the bolts as illustrated in the drawing.

The invention is susceptible of various changes in its form, proportions and minor details of construction and the right is herein reserved to make such changes as properly fall within the scope of the appended claims.

Having described the invention what is claimed is:—

1. The combination with a vehicle wheel, of a plurality of annular spring members arranged to provide a resilient rim having an annular groove therein and adapted to be spaced from and secured to the periphery of a wheel and means movable circumferentially of the rim and radially of the wheel, whereby the rim may be secured in position in a manner to permit of relative movement.

2. The combination with a vehicle wheel, of a plurality of annular spring members arranged to provide a resilient rim having an annular T-shaped groove therein and adapted to be spaced from and secured to the periphery of a wheel and means movable circumferentially of the rim and including T-shaped bolts located within said groove, whereby the rim may be secured in position in a manner to permit of relative movement.

In testimony whereof I affix my signature.

ENGLEY G. KILLERBRUE.